US009536570B2

(12) United States Patent
    Ptitsyn (10) Patent No.: US 9,536,570 B2
(45) Date of Patent: Jan. 3, 2017

(54) METHOD AND SYSTEM FOR SYSTEMATIZATION OF PRODUCTION-PROCESS VIDEO DATA

(71) Applicant: OBSHESTVO S OGRANICHENNOY OTVETSTVENNOSTYU "SINEZIS", Moscow (RU)

(72) Inventor: Nikolai Vadimovich Ptitsyn, Moscow (RU)

(73) Assignee: CAMERA BI LIMITED LIABILITY COMPANY, Moscow (RU)

( * ) Notice: Subject to any disclaimer, the term of this patent is extended or adjusted under 35 U.S.C. 154(b) by 0 days.

(21) Appl. No.: 14/925,209

(22) Filed: Oct. 28, 2015

(65) Prior Publication Data

US 2016/0118085 A1    Apr. 28, 2016

(30) Foreign Application Priority Data

Oct. 28, 2014 (EA) .................................. 201401064

(51) Int. Cl.
    *H04N 5/77* (2006.01)
    *H04N 5/93* (2006.01)
    (Continued)

(52) U.S. Cl.
    CPC ............. *G11B 27/19* (2013.01); *G06T 7/0004* (2013.01); *G06T 7/2093* (2013.01); *H04N 5/77* (2013.01);
    (Continued)

(58) Field of Classification Search
    USPC .......................... 386/223–224, 241, 248, 278
    See application file for complete search history.

(56) References Cited

U.S. PATENT DOCUMENTS 7,460,149 B1    12/2008  Donovan et al.
2008/0208698 A1  8/2008  Olson et al.
(Continued)

FOREIGN PATENT DOCUMENTS

EP    2337355 A2    6/2011

OTHER PUBLICATIONS

Search Report issued by UK Intellectual Property Office with regard to the Patent Application GB 1519085.3 based on EA 201401064 (dated Apr. 8, 2016).
(Continued)

*Primary Examiner* — Nigar Chowdhury
(74) *Attorney, Agent, or Firm* — BCF LLP (57) ABSTRACT

There are disclosed a method and a system for systematization of production-process video data. The method is executable at an electronic device. The method comprises: receiving data regarding a correspondence between at least one service zone of a video-data source and at least one workplace for a performance of a production operation; generating a list of identifier types for marking video data to be received form the video-data source; receiving data regarding the production operation from at least one input device for production-operation data, the data regarding production operation being indicative of at least one identifier of at least one workplace for the production operation; based on the data regarding the production operation and the data regarding the correspondence between at least one service zone and the at least one workplace for the production operation, determining a given at least one video-data source of a given service zone in which the production operation is currently being performed; composing a reference that is indicative of a correspondence between video data generated by the given at least one video-data source at least some of the identifiers in the list of identifier types for
(Continued)

marking video data to be received form the video-data source, the at least some of the identifiers being specifically selected for a type of the production operation being performed.

30 Claims, 7 Drawing Sheets

(51) Int. Cl.
    *G11B 27/00*     (2006.01)
    *G11B 27/19*     (2006.01)
    *G06T 7/20*     (2006.01)
    *G06T 7/00*     (2006.01)
    *H04N 5/781*     (2006.01)
    *H04N 5/91*     (2006.01)

(52) U.S. Cl.
    CPC ............... *H04N 5/781* (2013.01); *H04N 5/91* (2013.01); *G06T 2207/10016* (2013.01); *G06T 2207/30232* (2013.01)

(56) References Cited

U.S. PATENT DOCUMENTS

2014/0380146 A1* 12/2014 Mollis .............. H04N 21/26258
    715/234
2015/0318020 A1* 11/2015 Pribula ............ H04N 21/43615
    386/227
2015/0379739 A1* 12/2015 Dorner .................. G06T 11/001
    345/600

OTHER PUBLICATIONS

Damjanovski, V., CCTV, "Bible of video surveillance. Digital and network technologies", OOO "ISS Press," 2006, p. 478, ISBN: 5-87049-260-2.

Nilsson, Fredrik, "Intelligent network video: Understanding modern video surveillance systems", CRC Press, 2008, ISBN-10: 1420061569.

Service <<Videon>> of the company ZAO "Mobilnye videoresheniya", http://ivideon.ru/.

Ptitsyn, N. V., "Video analytics", 2013, http://synesis.ru/technology/videoanalitika.

* cited by examiner

42. Delay in order performance

41 Number of orders planned and performed

Quality and terms of order performance

| No. | WORKER | QUALITY | DELAY | VIDEO |
|---|---|---|---|---|
| 100 | Ivanov | OK | ON TIME | VIEW |
| 101 | Ivanov | OK | 35 MIN | VIEW |
| 102 | Petrov | OK | 16 MIN | NO |
| 103 | Ivanov | FAULTY | ON TIME | VIEW |
| 104 | Sidorov | OK | 10 MIN | VIEW |
| 105 | Sidorov | OK | ON TIME | VIEW |

METHOD AND SYSTEM FOR SYSTEMATIZATION OF PRODUCTION-PROCESS VIDEO DATA

CROSS-REFERENCE

The present application claims convention priority to Eurasian Utility Patent Application No. 201401064, filed on Oct. 28, 2014, entitled « СПОСОБ (ВАРИАНТЫ) СИСТЕМАТИЗАЦИИ ВИДЕОДАННЫХ ПРОИЗВОДСТВЕННОГО ПРОЦЕССА И СИСТЕМА (ВАРИАНТЫ)». This application is incorporated by reference herein in its entirety.

TECHNICAL FIELD

The invention relates to the processing, storage, marking, and searching of video data in video-surveillance systems in general and, in particular, to a method and a system for systematization of production-process video data.

BACKGROUND

A surveillance system usually includes one or more video cameras, video data storage (video server, video archiving system, or video recorder), and an operator's workplace. Streaming video data is received from the video cameras, recorded in video data storage and displayed at an operator's workplace.

Methods of video data search are an integral part of almost any video surveillance system. Modern video data storage allows to quickly searching and play recorded video fragments upon a user request. This random (direct) access to video data is implemented by means of video data marking or indexing. An index is a lookup table, connecting marks with addresses of the corresponding video data. The index significantly reduces access time to video data recorded in storage for further processing by the user or the computer.

A temporal index associates the temporal scale to video data, i.e. it allows the storage of quick searches of video data based on a specified date and time.

An event index contains a table of events and allows the storage of quick searches of video data based on a specified event such as signals of a motion detector or other sensors connected to the video surveillance system.

Video analytics, i.e. video analysis tools, based on vision algorithms, can be a source of events for generating the index. For example, video analytics allow defining such events as the motion of a person in a given direction and the appearance or disappearance of an object.

The index can contain additional information regarding an object that is recognized by video analytics for further search of video data. For example, the index can contain vehicle registration plate information, a person's height, a color of clothing or facial features.

As a rule, the indices are built in real time on an ongoing basis; they consist of video data sent into storage from surveillance cameras. The indices are subsequently used in the processing of user requests for information in video data storage.

Online video storage services like YouTube (http://youtube.com/) and Vimeo (http://vimeo.com/) also use various indices, e.g. indices based on video publishers and keywords. These services allow access to portions of video data by means of a hyperlink and playback of the video using browsers or mobile devices.

Online video surveillance services like DropCam (http://dropcam.com/) and iVideon (http://ivideon.com/) allow the reception of video data from users' surveillance cameras and the transmission of this data to browsers or mobile devices.

SUMMARY

Inventors of the present technology have appreciated at least one technical problem associated with the prior art solutions.

Currently, video surveillance systems are used mainly by the security services of an organization and are generally not used by other employees of the organization. The technological potential of video surveillance systems for use in organizational and production management has thus not been exploited.

The limitation of existing video surveillance and storage systems lies in the fact that the video is not related to a production process. The user has to manually select the camera for production process monitoring. The user has to view many hours of video in order to find desired production event. The user has no ability to immediately analyze the video data related to the production operation that is of interest to the user.

However, a video contains a lot of useful information for organization and production management, e.g. for detection of production process violations, control of quality and work performance, investigation of the reasons for the production of defective products, determination of the key factors in the effective performance of personnel or in an increase in labor productivity.

In the context of the embodiments of the present invention, the term "production process" means the process of creating any products or services with human involvement in an organization as well as the process of providing services for infrastructure and for material and technical bases. For example, a production process can be industrial production of construction materials; extraction and processing of commercial minerals; the maintenance of power station equipment; feeding of animals on a farm; maintenance and repair of automobiles; manufacturing of food at a factory; the delivery of health care in a hospital; performance of laboratory work in an educational institution; provision of client services in a store, a bank, or a hair salon; the sorting of mail in a post office; the arrangement of gambling games in a casino, etc.

One of the reasons for the limited application of video surveillance systems in production-process management is the lack of a link between video data and production process data. References are not formed and an index is not constructed in organizations, although these references and index would allow the quick search of the required video data by an employee of the organization based on the selected production operation, production worker, product, order number or other parameters of the production process.

Embodiments of the present invention allow the marking of video data, using production-process data, and the implementation of a quick object search (a person, object or means of transportation) in a video archive based on production-process data.

Embodiments of the present invention can be used for such tasks as marking (indexing) video archives, searching video data, detecting production process violations and automatically notifying users, controlling the quality and the terms of work performance, investigating reasons for the production of defective products, determining key factors in the effective performance of personnel, collecting static data on a production process, and downloading video data containing documentary information on a production process from a video archive.

Embodiments of the invention can form data in real-time for a technological surveillance center (quality-control center, security service) of an organization in order to prevent defective production, frustration in production planning and danger to the life and health of a production worker.

Embodiments of the invention can be used for rendering remote technical support, training personnel, providing results to customers, uploading videos onto a corporate website for public-relations purposes and settling disputes with agents and employees.

Embodiments of the invention can be used for automatic and semiautomatic tagging of videos, i.e. for adding text tags, key words, numerical data and other notes to the video.

Embodiments of the invention can work on local and global communication networks as well as on dedicated and cloud servers; it can also be embedded directly into video cameras, video servers, video recorders, and mobile devices in the form of hardware and/or software.

Embodiments of the invention can be used to provide various services on the Internet via a browser and/or mobile device, including systems of video surveillance, video recording, searches by individuals, production control, company management, motivation and training of personnel, contact with customers, and public relations.

Embodiments of the invention can be used in such activities as industrial production, extraction and processing of commercial minerals, energetics, farming, automobile maintenance, public catering, housing and utilities and social infrastructure.

Embodiments of the invention can be used for analyzing retail sales (retail analysis), controlling logistics operations (e.g. in warehouses and post offices) and controlling processes in the gambling industry (casinos, gambling games, gambling machines).

Embodiments of the invention can be used in video surveillance systems based on standards and/or regulations adopted by the Open Network Video Interface Forum (ONVIF, www.onvif.org), the Physical Security Interoperability Alliance (PSIA, www.psiaalliance org), or the Common Alerting Protocol (CAP, http://docs.oasis-open.org/emergency/cap/).

Embodiments of the invention can be integrated into production equipment, Business Intelligence (BI) systems, Enterprise Resource Planning (ERP) systems, and Content Management System (CMS).

In accordance with a first broad aspect of the present technology, there is provided a method for the systematization of production-process video data. The method is executable at an electronic device. The method comprises: receiving data regarding a correspondence between at least one service zone of a video-data source and at least one workplace for a performance of a production operation; generating a list of identifier types for marking video data to be received form the video-data source; receiving data regarding the production operation from at least one input device for production-operation data, the data regarding production operation being indicative of at least one identifier of at least one workplace for the production operation; based on the data regarding the production operation and the data regarding the correspondence between at least one service zone and the at least one workplace for the production operation, determining a given at least one video-data source of a given service zone in which the production operation is currently being performed; composing a reference that is indicative of a correspondence between video data generated by the given at least one video-data source at least some of the identifiers in the list of identifier types for marking video data to be received form the video-data source, the at least some of the identifiers being specifically selected for a type of the production operation being performed.

In some embodiments of the method, said receiving data regarding the correspondence between at least one service zone of the video-data source and at least one workplace for the performance of the production operation comprises receiving data regarding the correspondence between at least one service zone of the video-data source and at least one input device for the production operation data.

In some embodiments of the method, said receiving data regarding a correspondence between at least one service zone of a video-data source and at least one workplace for a performance of a production operation is executed before commencement of the production operation.

In some embodiments of the method, the production-process data further comprises at least one of: an indication of a start time, duration and end time for the production operation.

In some embodiments of the method, the list of identifier types of video data further comprises at least one of: an identifier of a production worker, a product, an order, a goods type, a service, a parcel, a container, a vehicle, and a technological operation.

In some embodiments of the method, the list of identifier types of video data further comprises the production-process data, the production-process data including at least one of: a reading of such instruments including at least one of scales, temperature meters, and flow-rate meters.

In some embodiments of the method, receiving data regarding a correspondence between at least one service zone of a video-data source and at least one workplace for a performance of a production operation comprises determining a type of production equipment that is located in the at least one service zone.

In some embodiments of the method, receiving data regarding a correspondence between at least one service zone of a video-data source and at least one workplace for a performance of a production operation comprises determining a type of production operations that can be executed in the at least one service zone.

In some embodiments of the method, receiving data regarding the production operation from at least one input device for production-operation data comprises receiving data from production equipment located in the at least one service zone, the data received in a form of a production-equipment signal without the direct involvement of a production worker.

In some embodiments of the method, the service zones are set in the form of a reference table correlating each video-camera service zone to an identifier of the production operation in the list of identifier types.

In some embodiments of the method, composing a reference is executed in response to a user request, the composing the reference being done on a basis of at least one of: data regarding the production operation, events of video analysis, and data regarding the at least one service zone.

In some embodiments of the method, receiving data regarding the production operation is executed in response to one of: detection of a signal of a motion detector indicative of a presence of a worker and as a result video data analysis.

In accordance with another broad aspect of the present technology, there is provided a system for marking production-process video data. The system comprises: a processor; a data-storage device operatively coupled to the processor; a video-data source operatively coupled to the processor; an input device operatively coupled to the processor; a computer-executable instruction stored on the data-storage device, the computer-executable instruction when executed by the processor configured to cause the processor to: receive data regarding a correspondence between at least one service zone of a video-data source and at least one workplace for a performance of a production operation; generate a list of identifier types for marking video data to be received form the video-data source; receive data regarding the production operation from at least one input device for production-operation data, the data regarding production operation being indicative of at least one identifier of at least one workplace for the production operation; based on the data regarding the production operation and the data regarding the correspondence between at least one service zone and the at least one workplace for the production operation, determine a given at least one video-data source of a given service zone in which the production operation is currently being performed; compose a reference that is indicative of a correspondence between video data generated by the given at least one video-data source at least some of the identifiers in the list of identifier types for marking video data to be received form the video-data source, the at least some of the identifiers being specifically selected for a type of the production operation being performed.

In some embodiments of the system, to receive data regarding a correspondence between at least one service zone of a video-data source and at least one workplace for a performance of a production operation, the processor is configured to receive data regarding a correspondence between at least one service zone of a video-data source and at least one input device for production-operation data.

In some embodiments of the system, the input device is stationary.

In some embodiments of the system, the input device is mobile.

In some embodiments of the system, the input device is remote relative to the video-data source.

In some embodiments of the system, the input device is embedded in equipment that executes the production operation.

In some embodiments of the system, the input device comprises at least one of: a generic computer, a workstation, a tablet computer, a mobile device, and a personal device.

In some embodiments of the system, the input device is one of an RFID and an NFC device.

In some embodiments of the system, the input device is one of a 1D and a 2D barcode reader for composing the reference to video data.

In some embodiments of the system, the system further comprises at least one of a motion detector and a human-presence detector that are used in the service zone for the purpose of at least one of forming data regarding the production process and for checking the authenticity of the data.

In some embodiments of the system, the reference is a composite reference.

In some embodiments of the system, the input device is configured for input by at least one of voice commands and gestures of a production worker.

In some embodiments of the system, the input device is implemented as one of software and a hardware module of a video analysis system of the processor.

In some embodiments of the system, the reference is a hyperlink.

In some embodiments of the system, the reference points to the video-data source for receiving video data in real-time mode.

In some embodiments of the system, the reference is generated in response to receiving a user request.

In some embodiments of the system, the reference points at the video data recorded at a point of time before a time when a user request for video data is received.

In some embodiments of the system, the reference to video data further includes at least one of:
a unique symbol sequence;
a hyperlink;
an URI;
an identifier of the video-data source;
an identifier of the service zone of the video-data source;
a temporal mark of the start of the production operation;
a temporal mark of the end of the production operation;
an identifier of the production operation;
an identifier of the production worker;
an identifier of the product being produced;
an identifier of the order being performed;
a number of the object being processed;
a number of the group of objects being processed.

DETAILED DESCRIPTION OF THE NON-LIMITING EMBODIMENT(S)

Embodiments of the present invention are directed to eliminating the above-described problem that prevents the widespread use of a video-surveillance system for management of a production process. Embodiments of the present invention allow forming a reference to video data related to a production-operation event or some other event in the production process. Embodiments of the present invention also allow generating an index of video data on the basis of operations or events, such as the beginning and end of a production operation, a production worker's arrival to or departure from the workplace, a customer's arrival to or departure, the arrival of a product or materials.

A reference to production-operation video data is formed on the basis of data on the production operations and service zones (surveillance zones) of video cameras.

Along with video-camera surveillance, an input device for production-process data is also used, which allows to mark video-data with respect to production-process events.

The index of video data originating from a video camera is supplemented by the identifier of the production operation potentially occurring near this video camera or within the surveillance zone of this video camera. The index of video data can also be supplemented by identifiers of a production worker, a product, an order as well as by other data regarding the production process. For example, the index can contain readings of instruments such as scales, thermometers, and flow-rate meters.

A technical result of the embodiments of the present invention can include the increased effectiveness in the use of video-surveillance cameras for the control of a production process in real-time as well as faster and more accurate search of video data containing images of one or more production workers from the production operation, or production equipment, product, or customer.

The input of initial data regarding a video camera service zone can be performed by setting the service zone of the video camera to the production-area. The video camera service zone can be set using a dot, a polygon or any other geometrical figure that characterizes the service area of the camera.

The input of initial data regarding a video camera service zone can be performed by setting identifiers of the equipment or workplaces located in the service zone of the video camera.

The input of initial data regarding a video camera service zone can be performed by setting identifiers of the production operations performed in the service zone of the video camera.

The input of data regarding a correspondence between at least one service zone (surveillance zone) of the video data source (video camera) and at least one workplace of the production operation can be performed prior to the start of the production process.

Data regarding a production operation from one or more input devices can additionally include a start time, duration and/or end time of a given production operation.

The list of identifiers (in the index) of video data can be supplemented by data regarding the production process, e.g., readings of such instruments as scales, temperature meters, flow-rate meters.

The input of initial data regarding a video camera service zone can be performed by associating the video-camera service zone with the identifier or type of production equipment located in the service zone of the video-camera.

The input of initial data regarding a video-camera service zone can be performed by associating the video-camera service zone with the type of production operations performed in this zone. The input of initial data regarding the video-camera service zone can be performed during the stage of production operation planning.

Service zones can be defined in the form of a table setting the interrelation between the video camera and the production equipment, production-operation type, production order, product type, production worker, or some other element of the production process. The table can contain identifiers of video cameras and of the above-mentioned elements of the production process.

Service zones can be defined in the form of a table of references setting the interrelation between the video-camera service zone and each identifier number specified in the list of identifier types of a given production operation.

A reference can be generated dynamically, upon user request, on the basis of data regarding the production operation and/or the events based on video analysis and data regarding the video camera service zone.

The input of initial data regarding a production operation and/or the video camera service zone can be performed in advance, e.g. at the stage of production operation planning or directly before the production operation begins.

The input of initial data regarding a production operation can also be performed during production.

The input of initial data regarding a production operation can be performed by a production operation worker, a manager of a production worker, a production planning manager, or a production customer.

For example, a production operation worker can read a workplace identifier, such as a barcode or an RFID tag, using a special reader. According to the embodiments of the present invention, the received identifier can be used for automatic identification of the video camera located in the service zone where the production operation is being performed.

The input of initial data regarding the production operation can be performed automatically on the basis of production equipment signals, without direct human intervention.

For example, production equipment can automatically read the identifier of a product, container, or vehicle (truck number, wagon number).

Video data from the video data source can be recorded on a storage device, e.g., on a hard drive disk, network storage, DVR or virtual storage such as Amazon™ Glacier (http://en.wikipedia.org/wild/Amazon_Glacier).

Video data from the video data source can be displayed to the user on the display device, e.g., a computer monitor or a screen of a mobile device.

Data regarding the production operation can be recorded on a storage device.

A reference can be recorded in a video data index on a storage device for further search of video data using various inquiries, such as searching on the basis of an inquiry regarding an identifier of a production operation, production worker, product, order number or time of operation.

A production operation identifier can be assigned by computer software and can contain numbers or other symbols.

Instead of the production operation identifier, it is possible to use an identifier (number) of an order, production worker or material.

A production operation identifier can be composite, i.e. it can include identifiers of the production worker, product, order or material.

The list of the types of identifier for marking can be programmed by the developer, and a set of program instructions need not necessarily include this step.

Two variants of a system for marking production process video data are described herein for the implementation of the present invention.

The input device for production-operation data can be either fixed (stationary) or mobile.

The input device for production-operation data can be located directly at the place of production. In this case the input of data is performed by the production worker or by some other appointed employee at the workplace of the production operation.

The input device for production-operation data can be remote. In this case the input of data is performed by a production planning manager, the production customer, or some other appointed employee.

The input device for production-operation data can be mobile. For example, the workshop supervisor can use a mobile device for inputting data about production operations in various workshops.

The video-data source can be an IP video camera, an IP video server (video coder), a media server like Wowza (http://wowza.com/), or a visualization ("cloud") surveillance server like iVideon (http://iVideon.com/).

The video-data source can be an analog camera or a machine vision camera with a GigE Vision interface (Gigabit Ethernet Vision), a USB (Universal Serial Bus), or an HD-SDI (High Definition Serial Digital Interface). The video-data source can be a video camera embedded in the mobile device of the production worker. Video data about the production operation and/or the place of the production operation can be entered via this mobile device.

The input device for production-operation data can be embedded in the production equipment. In this case the input of data is performed automatically, on the basis of the production-equipment signals, without the direct involvement of the production worker.

The input device for production-operation data can be either a touchpad or a keypad, with the help of which the production worker sends signals about the start and end of the production operation.

The input device for production-operation data can also be used for the input of additional data about the technological operation, e.g., the identifier of the production worker, product, order number, or other data about the production process.

The input device for production-operation data can be a standard or specialized computer, workstation, tablet computer, mobile device, or personal device.

The input device for production-operation data can be an RFID or an NFC device or a barcode reader (barcodes, QR codes, etc.). For example, such a reader of marks can be used at a site of production, in a warehouse, in a logistics center, or in a mail-sorting device at a post office for tracking components, products, goods, cargo, or parcels on the basis of the identifier. A marks reader is used for composing a reference to the video containing the object with the identifying mark. The received identifier can be used for marking the video archive and searching objects in it.

The input device for production-operation data is a 1D and/or a 2D barcode reader for composing data about the production process and/or for checking the authenticity of these data.

In some embodiments of the present invention one can use combined marks as the production-operation identifier; these marks can involve several technologies, as mentioned above, or other suitable technologies that will be developed later.

The input device for production-operation data uses voice commands and/or gestures of the production worker.

A reference can be a hyperlink.

A reference can point at the portions of video data recorded for receiving the archive video and also at the video-data source for receiving "live" video (video in real-time mode) during the production operation.

A video-data reference can be composed on user request in manual, semiautomatic, or automatic mode.

The input device for production-operation video data can be software and/or hardware modules of video analysis. The production-operation data are composed on the basis of the results of video analytics (video analysis). One can use human-presence (-absence) detectors at the place of production and in the service zone, detectors of a person entering (leaving) the production-operation zone, detectors of product appearance (disappearance), detectors of motion in the direction of the production-operation zone.

The input of production-operation data can be performed in advance, e.g., in the production-planning mode or in real-time mode during production.

Modules of video analysis can be used for production-operation control. For example, if activity is detected in the production-operation zone when no actions are supposed to be performed according to the production-operation schedule, the production worker, production manager, or some other employee appointed to control the start of the unplanned operation is notified. If an absence of activity is detected in the production-operation zone when an action is supposed to be performed according to the production-operation schedule, organization employees are notified about the noncompliance.

On the basis of radio signals coming from personal devices and other radio-frequency identifiers, the location of the production workers can be detected.

Video recording is performed in event-driven mode. Recording can start at the moment of the start of the production operation or at the end when the motion detector records the end of the operation. In some cases video recording is performed in continuous mode.

The computer system can additionally display on the display device the recorded video data and the related identifiers of the production operations, production workers, and products, and other technological information.

A reference relating the recorded video data from the video-data source to the production-operation video data from the production-operation source is saved on the storage device, e.g., on the computer, video server, video recorder, network-attached storage, or cloud storage.

A reference can be stored in a database of any other type, in documents, or on web pages.

A reference can relate a hyperlink, a URI, a combination of the identifier of the video camera and a temporal mark, a production-operation identifier, a video-record identifier, or a file name (for example, in the container MP4, MKV, OGV, WMA) to the video record of the production operation.

A reference can be a hyperlink to the streaming-video source, e.g., the source transmitting video data using RTSP (Real Time Streaming Protocol), RTMP (Real Time Messaging Protocol), HLS (HTTP Live Streaming), or DASH (Dynamic Adaptive Streaming over HTTP) protocols.

A reference can be composed dynamically on user request on the basis of data about the production operation and/or the events of video analysis and data about the video-camera service zone.

Production-operation video data can be displayed on a display device, e.g., the employee's monitor, a web browser, or a mobile device.

According to the embodiments of the present invention, the method can be used for production-process control both in online mode (on a real-time basis during operation performance) and in retrospective mode (after the end of the production operation).

In an online mode, for the purpose of operation control, the reference to video data can be transmitted to the user, e.g., a specialist in the quality-control department, at the moment of the start of the production operation. The user can analyze the newly recorded (just recorded) video from the moment of the start of the production operation and also the live video coming in real-time mode from the production place.

If the user needs to view the current status of the production operation, the reference to the streaming video directly from the video-data source (camera) can be transmitted instead of the reference to the recorded video data.

In retrospective mode the reference to video data can be included in the results of a search in the archive of production events or in a report on the production process. Such reference allows the quick start of a view by the user of the video data related to the selected production operation.

For example, the user can view in the Internet web browser the list of production operations in the course of which the planned terms were violated and can quickly analyze the video records containing these production operations.

Embodiments of the present invention can be used in conjunction with existing online services of video surveillance and storage, e.g., YouTube (http://youtube.com/), DropCam (http://dropcam.com/), iVideon (http://ivideon.com/).

The computer system can perform video-data recording in continuous mode or in event-driven mode in the course of the production operation.

The computer system can record production-operation data; the recorded data can be used as the index of video data for further search.

A reference to video data can contain one or more parameters selected from:
 a unique symbol sequence
 a hyperlink
 a Unique Resource Identifier (URI)
 an identifier of the video-data source
 an identifier of the service zone of the video-data source
 a temporal mark of the start of the production operation
 a temporal mark of the end of the production operation
 an identifier of the production operation
 an identifier of the production worker
 an identifier of the product being produced (processed)
 an identifier of the order being performed
 a number of the object being processed
 a number of the group of objects being processed The video-data source and the input device for production-operation data can be combined into one device. In this case the relationship between the service zone of the video-data source and the input device for production-operation data can be set in advance by this combined device producer.

The video-data source can be a rotating camera (PTZ), and the video-camera service zone can be adjusted (for example, automatically) after every change of the rotating camera location. The rotation of the camera can be customized to the production points by programming the positions in advance.

References relating the recorded video data to the production-operation stages can be stored on a backup (supporting) computer system.

The video-data source can be one of the following devices: a video camera, video recorder, video server, video coder, or some other suitable device.

The video-data source can be the video camera embedded in the mobile device of the production worker; production-operation video data and/or data about the place of the production operation can be entered with the help of this mobile device.

The production-operation identifier can be either unique or nonunique. For example, it is possible to use as a nonunique identifier the code for production-equipment maintenance or for the type of product being produced.

In the described embodiment of the present invention it is possible to use special software (application) for the production equipment and personal devices; this software will register data about the technological operation and will give feedback to the production worker. For example, special software can display the planned production operations and notify the production worker by sending an audio signal if the production worker forgot to give the signal about the start or end of the operation.

The computer system can be virtualized or it can be a "cloud," i.e., not limited by the embodiment, physical configuration, or geographical location of the hardware.

The computer system can record video data in event-driven mode upon a signal from the production-process source.

The computer system can use a motion detector and/or video analytics for more precise indexing and search of the production-process video data. The motion detector and/or video analytics can either be embedded in the video camera or function on the server. For example, the motion detector and/or video analytics can be used for detecting the nonconformity of the production plan to the actual production situation.

Figure 1:
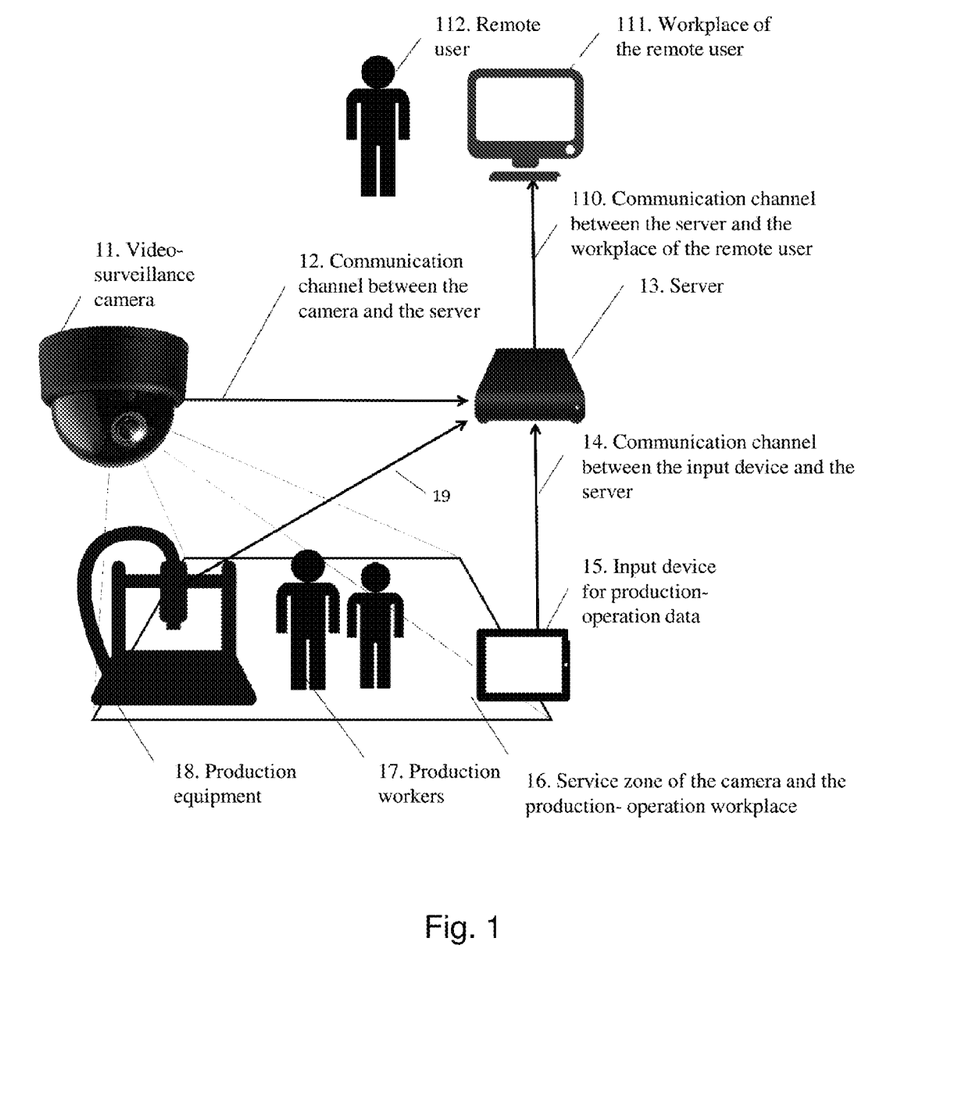
FIG. 1. depicts a non-limiting embodiment of a scheme for implementing a method for marking production process video data.

FIG. 1 depicts an implementation scheme for marking production process video data. A video camera 11 is installed for monitoring a production process. The service zone of the video camera 11 and production operation workplace 16 cover the production equipment 18 and people—the production workers 17 of this process. Video data is transmitted from the video camera 11 via a communication channel 12 to a processing and storage server 13. At the configuration stage, initial data regarding the service zone of the video camera 11 is input and, as a result, the video camera 11 is associated with particular production equipment or the location of the production operation. The device for the input of production operation data 15 can be stationary, fixed in the production operation zone or remote and/or mobile (portable). When one of the system operation production workers 17 or some other employee of the organization enters data regarding the beginning and end of the production operation, this data is transmitted via communication channel 14 to processing and storage server 13. The processing and storage server 13 simultaneously records the received video data and the production operation data.

Data regarding the beginning and end of the production operation can be entered during production or in advance thereof, i.e. during production planning.

The server 13 indexes video data on the basis of production process events received from the device for the input of production operation video data 15 and/or from production equipment 18.

The video camera 11 and/or the server 13 perform analytical processing of the video data from the video camera 11. When movement of people in the service zone 16 of the video camera 11 is detected without entry of data regarding the start of the production operation, the server 13 generates a message for production worker 17 regarding the necessity to enter such data. Such a message (such as a voice message or the like) can be transmitted via device for input 15 or via a loudspeaker.

When there is no motion in the service zone 16 of the video camera 11 for a period exceeding a predetermined amount of time, the server 13 can automatically generate the video data mark for the end of the production operation, and this mark can correspond to the moment of the last motion in the service zone 16.

Remote user 112, through their workplace 111, can connect to the server 13 via a communication channel 110 in order to receive reports and production operation video data. The remote user 112 can be an organization manager, an employee of a technical support center, an employee of a technological monitoring center (quality-control) or training staff.

The communication channels 12, 14 and 110 can be either wired or wireless as well as either private or public.

The server 13 generates the following reports for the user 112: (1) production operations (in the course of being performed, completed, uncompleted or delayed); (2) production workers, with the specification of the number of operations completed and outstanding within an established timeframe; (3) products (orders), with the specification of the number of products (orders) manufactured and not manufactured within an established timeframe.

The report contains hyperlinks which allow the remote user 112 to view video data on each production operation, production worker and product (order).

In addition, the remote user 112 receives on a display at their workplace 111 a message regarding the beginning and end of production operations. The remote user 112 can view "live" video from the video cameras 11 installed in the workplace where the production operation selected by the user is being performed; a user can also view the recorded video that corresponds with the selected production operation.

The remote user 112 has voice communication tools for communicating with the user 17; these tools allow prompt communication by the remote user 112 with a production worker (i.e. the user 17), and notification to the user 17 regarding identified production problems or the production worker's errors. Voice communication tools can be embedded in the device for input of production operation data 15, production equipment 18 and the workplace of the remote user 111.

In one embodiment of the invention, the remote user 112 receives a reference to video data that is recorded on the server 13.

In another embodiment of the invention, the remote user 112 receives the reference to video data which contains an ongoing production operation and which is transmitted directly from the video camera 11, bypassing the recording subsystem of the server 13.

Production equipment 18 can perform functions of the device for input of production-operation data 15, transmitting data regarding the beginning and end of a production operation via communication channel 19.

Figure 2:
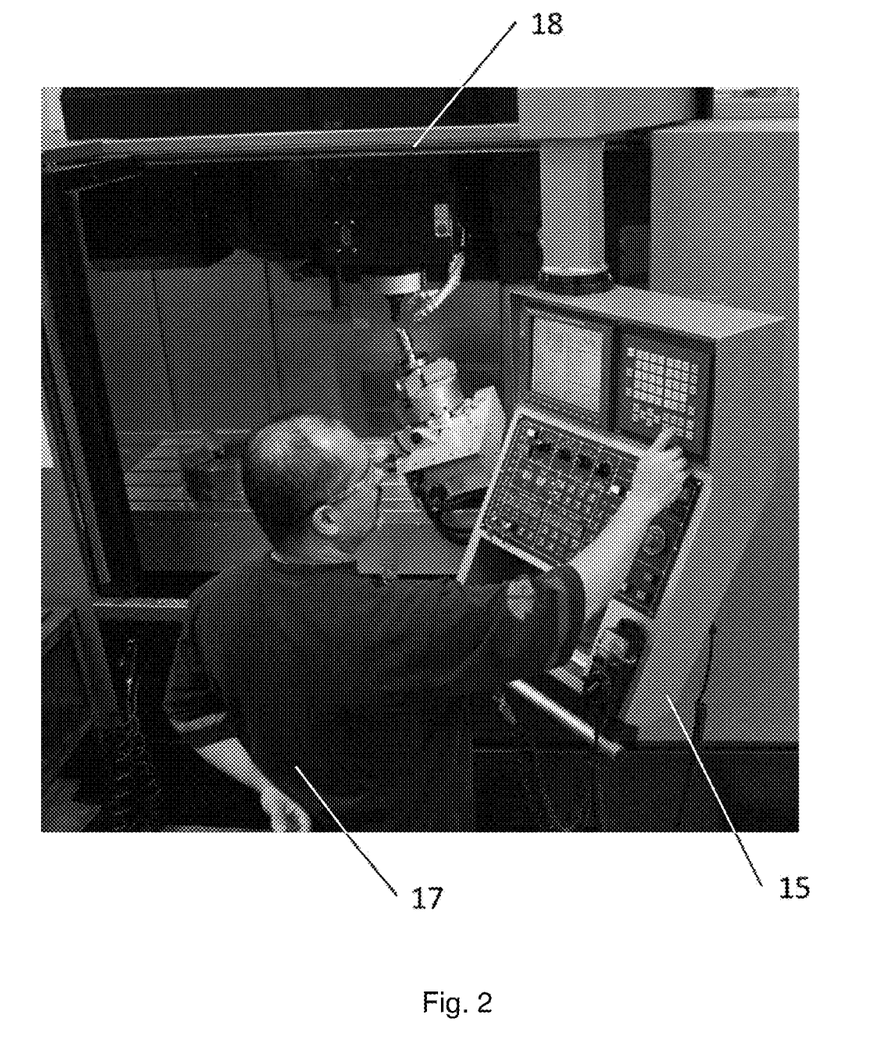
FIG. 2. depicts an example of an input of production process data by a production worker.

An example of video data received from the video camera 11 is depicted in FIG. 2.

Figure 3:
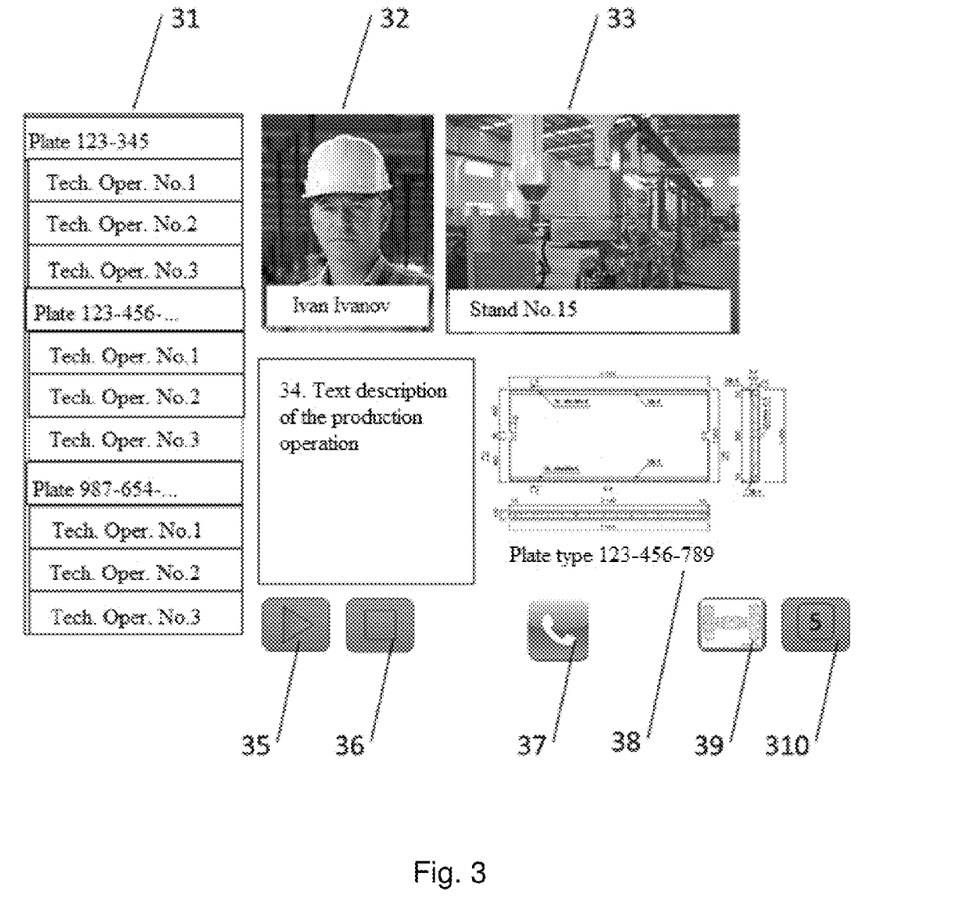
FIG. 3. depicts an example of a user interface of a device for input of production operation data.

An example of a graphic user interface (GUI) of the input device 15 is depicted in FIG. 3.

Figure 4:
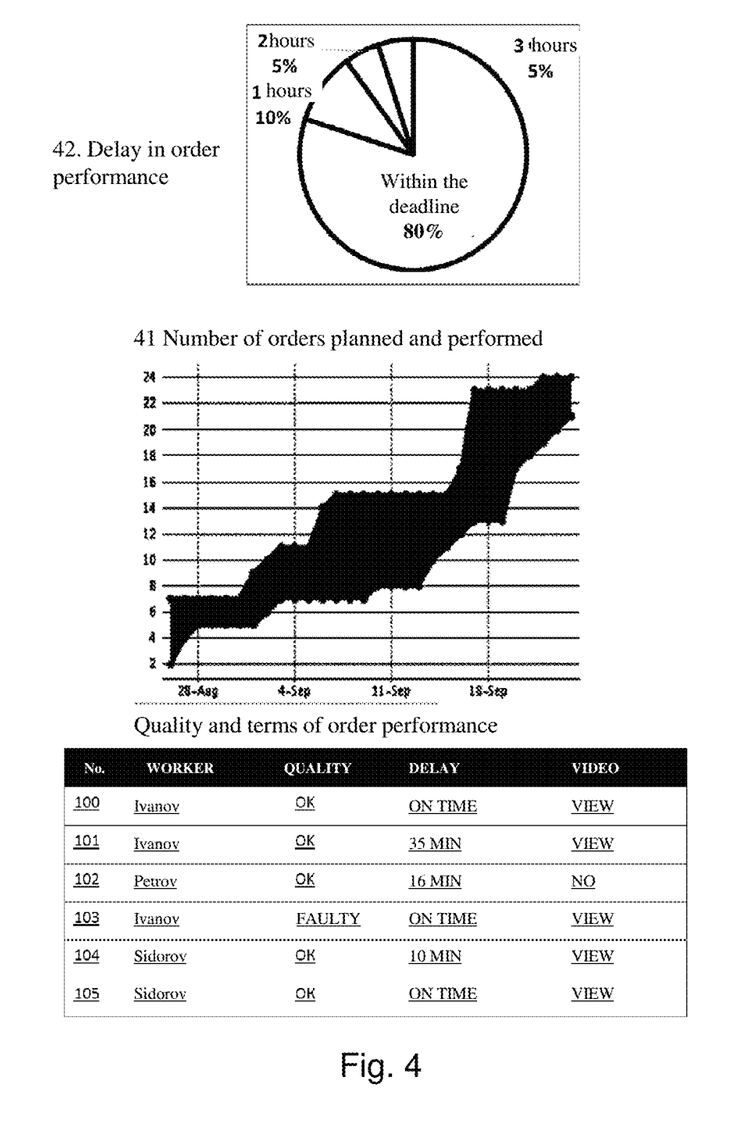
FIG. 4. depicts an example of a report on the performance of a production process operation.

An example of a report on a production process that is displayed at the workplace of the remote user 112 is depicted in FIG. 4.

Figure 5:
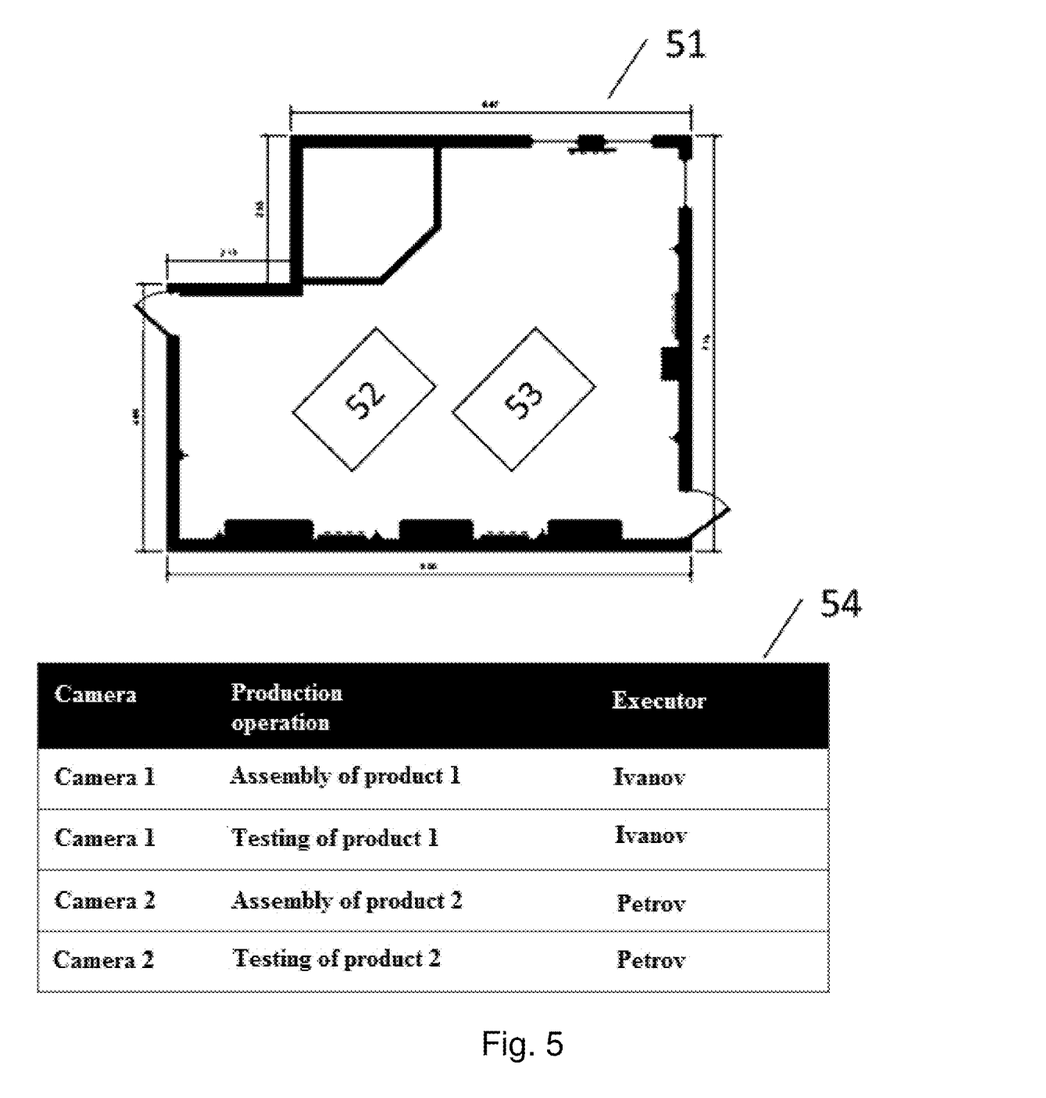
FIG. 5. depicts an example of initial data regarding the service zone of a video camera in the form of a plan of the production area and in the form of a table of the correspondence between video cameras and production operations.

An example of initial data regarding service zones of video cameras is depicted in FIG. 5.

Figure 6:
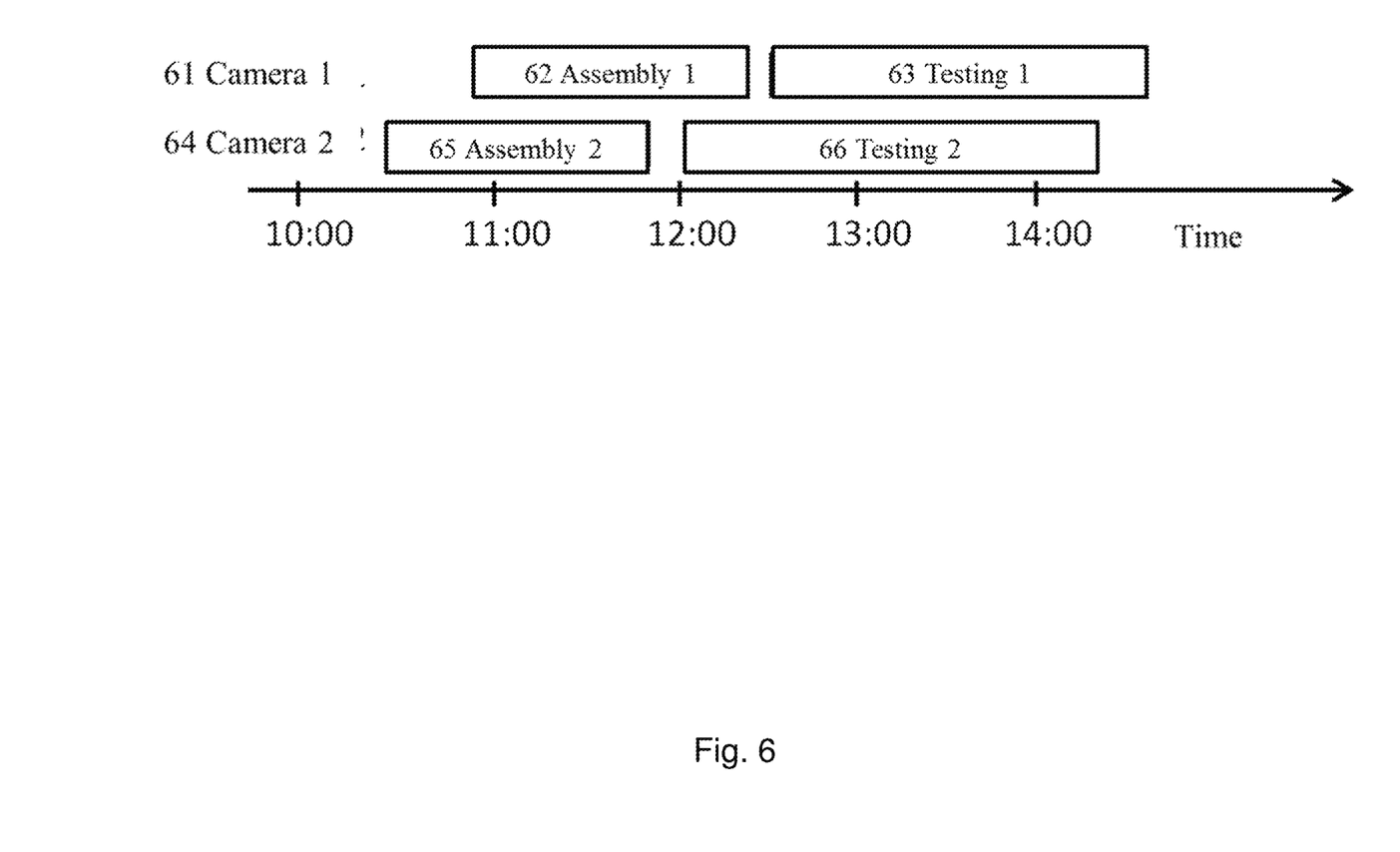
FIG. 6. depicts an example of a video archive temporal index obtained using the suggested method.

An example of a video archive index is depicted in FIG. 6.

FIG. 2 is an example of the input of production process video data. FIG. 2 depicts the production worker 17, the production equipment 18, and the device for input of production-operation data 15.

FIG. 3 is an example of a user interface of the device for input of production operation data 15. This interface can be implemented on a touchpad tablet computer, for example. The interface includes the following elements, as an example:

A list of products and production operations 31 contains a list of planned production operations and a list of unplanned operations that are to be performed by a production worker 32 at the location of production operation 16. The ongoing operation is marked in color, for example.

A photo and a text identifier for the production worker 32 are indicated in order to avoid misidentification by the user 17.

A photo and a text identifier of the location of production operation 33 are indicated in order to avoid an error in identifying the location of production operation 16.

The description of production operation 34 contains information useful to the production worker 17 during the production operation, e.g. technological process features, control readings of measuring instruments.

Production operation start button 35 allows the creation of a time stamp and reference to the video data of the beginning of a production operation.

Production operation end button 36 allows the creation of a time stamp and reference to the video data of the end of a production operation.

Emergency button 37 allows prompt communication by the production worker 17 with the technical support center if a problem occurs.

The product (orders, customers) scheme or photo 38 allows a production worker to verify the correctness of the information entered and the performance of a production operation.

Button 39 allows the location of a production operation to be selected if the current input device is mobile (portable). If the device is stationary, button 39 is not required.

Button 310 allows opening a window for text input and allows input by the production worker of comments regarding the work performed.

FIG. 4 is an example of a production process report for a manager of an organization, (for example, the remote user 112) obtained using the computer system of FIG. 1. The report includes, as an example:

A line graph of the number of planned and completed orders (production operations, produced products) 41. The upper line represents the number of scheduled tasks and the lower line shows the number of completed tasks. The manager can select any point on the graph of the performed orders and view a list of these orders, as shown in table 43.

A pie chart of the delays of orders 42 shows the number of orders completed within a deadline, the number delayed by 1 hour, the number delayed by 2 hours and the number delayed by 3 or more hours. The manager can select any sector of pie chart 42 and view the list of orders according to the selected sector, as shown in table 43.

The table of quality and timeframes of orders performed 43 contains a sequence number of the order (production operation), an identifier of the production worker, a quality of order performance, a delay time, and a reference to a video of performance of an order. Each element of the table comprises a hyperlink, which allows verification of the specified data. The number and content of the order are defined during the planning stage. The production worker and the beginning and end times of work related to the order are determined by the system of FIG. 1. Work quality is determined by a specialist in the quality control department on the basis of the video data generated by the system. The manager can select a video containing any concrete given operation and view it using the "VIEW" reference generated by the system.

FIG. 5 is an example of initial data regarding the service zone of a video camera (such as the camera 11). This data consists of a plan of production area 51, a graphic symbol for the service zones of video cameras 52 and 53 and a table of the correspondence between camera identifiers and production operation identifiers 54. The table 54 can be composed manually by the user or automatically on the basis of the plan 51. The plan 51 or the table 54 allow automatic determination of the identifier of the video camera located in the service zone where the specified production operation is being performed.

FIG. 6 is an example of a temporal index of the archive. The example contains the index for the two video cameras 61 and 64. In the service zone of the video camera 61, the production operations 62 and 63 are being performed. In the service zone of the camera 64, the production operations 65 and 66 are being performed.

Figure 7:
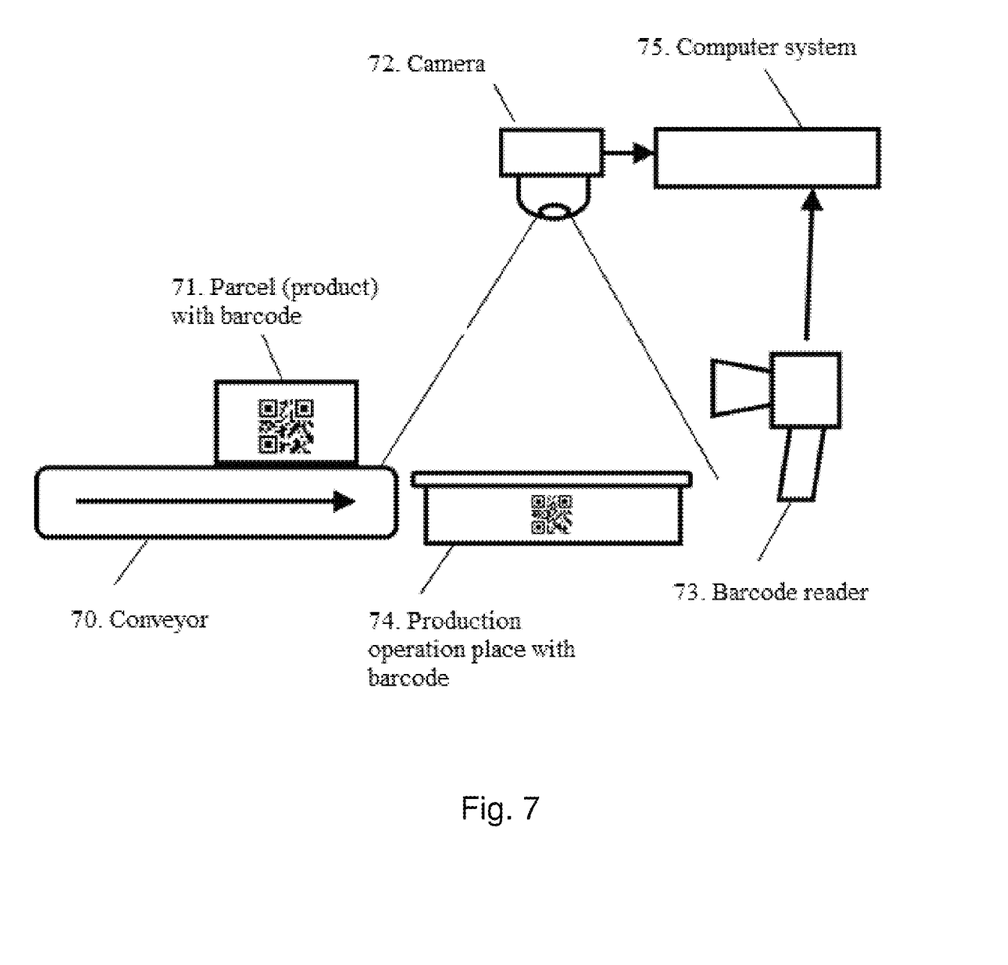
FIG. 7. depicts a non-limiting embodiment of a scheme for implementing a method for marking production process video data using a barcode.

FIG. 7 depicts a scheme for the implementation of a method for marking production process video data with the use of a barcode. Conveyor 70 of a mail-sorting department at a post office or logistics center delivers parcel 71, with a mark in the form of barcode, to the location of production operation 74 with another barcode. The place of production operation can be, for example, a work desk or a container. The place of the production operation 74 is located in the service zone of a video camera 72. The device for input of production operation data is a manual barcode reader 73, associated with a production worker (not depicted in FIG. 7). The video camera 72 and the barcode reader 73 are connected to a computer system 75. Other video cameras and barcode readers that are not shown in FIG. 7 can also be connected to this computer system 75. Data regarding the correspondence between the service zone of video camera 72 and the location of production operation 74 is entered. The identifier types include: (1) a camera identifier; (2) a production worker identifier (having a unique connection with barcode reader 73); (3) a parcel identifier; and (4) identifier of the place of production operation.

The computer system 75 includes a disk storage subsystem and records video data supplied from the video camera 72 and production process data supplied from the barcode reader 73.

The production worker, using barcode reader 73, reads the identifier of the place of production operation 74. The computer system 75 automatically specifies the video camera 72 in the service zone where the production operation is being performed on the basis of the data entered earlier, regarding the correspondence between the activity zone of video camera 72 and the identifier of the location of the production operation 74. The computer system records the connection between the video camera 72 (the location of the production operation) and the barcode reader 73 (the production worker).

If the production worker forgets to read the identifier of the location of the production operation, the computer system 75 can automatically notify the production worker by means of a communication via loudspeaker after detecting motion in the activity zone of video camera 72.

If a plan of tasks of production workers for the given location of the production operation is registered in the computer system, the computer system can automatically identify the production worker on the basis of the plan.

The production worker, using barcode reader 73, reads the identifier of parcel 71. The computer system automatically specifies the video camera 72 in the service zone where the production operation is being performed on the basis of the connection recorded in the previous step.

The technical result of the embodiments of the present invention in this case is reached as follows: the computer system creates a reference to video data supplied from the video camera 72; this reference includes: (1) the video camera identifier; (2) the identifier of the location of the production operation; (3) the production worker identifier associated with the manual barcode reader; (4) the date and time of the production operation; and (5) the parcel identifier. The received reference is recorded in the index of the video archive of the computer system.

The location of the production operation can be a container for parcels. If the container barcode is placed on top, the identifier of the place of the production operation (container identifier) can be received by the computer system automatically by reading the barcode on the container using the video camera 72.

Although this invention is described with reference to an example embodiment, this description is not intended to be limiting; it is provided for the purpose of illustration and better understanding of the essence of this invention, the scope of which is determined by the claims attached hereto.

The invention claimed is:

1. A method for the systematization of production-process video data, the method executable at an electronic device, the method comprising:
receiving data regarding a correspondence between at least one service zone of a video-data source and at least one workplace for a performance of a production operation;
generating a list of identifier types for marking video data to be received form the video-data source;
receiving data regarding the production operation from at least one input device for production-operation data, the data regarding production operation being indicative of at least one identifier of at least one workplace for the production operation;
based on the data regarding the production operation and the data regarding the correspondence between at least one service zone and the at least one workplace for the production operation, determining a given at least one video-data source of a given service zone in which the production operation is currently being performed;
composing a reference that is indicative of a correspondence between video data generated by the given at least one video-data source at least some of the identifiers in the list of identifier types for marking video data to be received form the video-data source, the at least some of the identifiers being specifically selected for a type of the production operation being performed.

2. The method of claim 1, wherein said receiving data regarding the correspondence between at least one service zone of the video-data source and at least one workplace for the performance of the production operation comprises receiving data regarding the correspondence between at least one service zone of the video-data source and at least one input device for the production operation data.

3. The method of claim 1, wherein said receiving data regarding a correspondence between at least one service zone of a video-data source and at least one workplace for a performance of a production operation is executed before commencement of the production operation.

4. The method of claim 1, wherein the production-process data further comprises at least one of: an indication of a start time, duration and end time for the production operation.

5. The method of claim 1, wherein the list of identifier types of video data further comprises at least one of: an identifier of a production worker, a product, an order, a goods type, a service, a parcel, a container, a vehicle, and a technological operation.

6. The method of claim 1, wherein the list of identifier types of video data further comprises the production-process data, the production-process data including at least one of: a reading of such instruments including at least one of scales, temperature meters, and flow-rate meters.

7. The method of claim 1, said receiving data regarding a correspondence between at least one service zone of a video-data source and at least one workplace for a performance of a production operation comprises determining a type of production equipment that is located in the at least one service zone.

8. The method of claim 1, said receiving data regarding a correspondence between at least one service zone of a video-data source and at least one workplace for a performance of a production operation comprises determining a type of production operations that can be executed in the at least one service zone.

9. The method of claim 1, wherein said receiving data regarding the production operation from at least one input device for production-operation data comprises receiving data from production equipment located in the at least one service zone, the data received in a form of a production-equipment signal without the direct involvement of a production worker.

10. The method of claim 1, wherein service zones are set in the form of a reference table correlating each video-camera service zone to an identifier of the production operation in the list of identifier types.

11. The method of claim 1, wherein said composing a reference is executed in response to a user request, the composing the reference being done on a basis of at least one of: data regarding the production operation, events of video analysis, and data regarding the at least one service zone.

12. The method of claim 1, wherein receiving data regarding the production operation is executed in response to one of: detection of a signal of a motion detector indicative of a presence of a worker and as a result video data analysis.

13. A system for marking production-process video data, the system comprising:
a processor;
a data-storage device operatively coupled to the processor;
a video-data source operatively coupled to the processor;
an input device operatively coupled to the processor;
a computer-executable instruction stored on the data-storage device, the computer-executable instruction when executed by the processor configured to cause the processor to:
receive data regarding a correspondence between at least one service zone of a video-data source and at least one workplace for a performance of a production operation;
generate a list of identifier types for marking video data to be received form the video-data source;
receive data regarding the production operation from at least one input device for production-operation data, the data regarding production operation being indicative of at least one identifier of at least one workplace for the production operation;
based on the data regarding the production operation and the data regarding the correspondence between at least one service zone and the at least one workplace for the production operation, determine a given at least one video-data source of a given service zone in which the production operation is currently being performed;
compose a reference that is indicative of a correspondence between video data generated by the given at least one video-data source at least some of the identifiers in the list of identifier types for marking video data to be received form the video-data source, the at least some of the identifiers being specifically selected for a type of the production operation being performed.

14. The system of claim 13, wherein to receive data regarding a correspondence between at least one service zone of a video-data source and at least one workplace for a performance of a production operation, the processor is configured to receive data regarding a correspondence between at least one service zone of a video-data source and at least one input device for production-operation data.

15. The system of claim 13, wherein the input device is stationary.

16. The system of claim 13, wherein the input device is mobile.

17. The system of claim 13, wherein the input device is remote relative to the video-data source.

18. The system of claim 13, wherein the input device is embedded in equipment that executes the production operation.

19. The system of claim 13, wherein the input device is comprises at least one of: a generic computer, a workstation, a tablet computer, a mobile device, and a personal device.

20. The system of claim 13, wherein the input device is one of an RFID and an NFC device.

21. The system of claim 13, wherein the input device is one of a 1D and a 2D barcode reader for composing the reference to video data.

22. The system of claim 13, the system further comprises at least one of a motion detector and a human-presence detector that are used in the service zone for the purpose of at least one of forming data regarding the production process and for checking the authenticity of the data.

23. The system of claim 13, wherein reference is a composite reference.

24. The system of claim 13, wherein the input device is configured for input by at least one of voice commands and gestures of a production worker.

25. The system of claim 13, wherein the input device is implemented as one of software and a hardware module of a video analysis system of the processor.

26. The system of claim 13, wherein the reference is a hyperlink.

27. The system of claim 13, wherein the reference points to the video-data source for receiving video data in real-time mode.

28. The system of claim 13, wherein the reference is generated in response to receiving a user request.

29. The system of claim 13, wherein the reference points at the video data recorded at a point of time before a time when a user request for video data is received.

30. The system of claim 13, wherein the reference to video data further includes at least one of:
a unique symbol sequence;
a hyperlink;
an URI;
an identifier of the video-data source;
an identifier of the service zone of the video-data source;
a temporal mark of the start of the production operation;

a temporal mark of the end of the production operation;
an identifier of the production operation;
an identifier of the production worker;
an identifier of the product being produced;
an identifier of the order being performed;
a number of the object being processed;
a number of the group of objects being processed.

\* \* \* \* \*